(12) United States Patent
Mak

(10) Patent No.: US 7,313,767 B2
(45) Date of Patent: Dec. 25, 2007

(54) SYSTEM AND METHOD FOR PRESENTING TIME RELATED DATA ON A SMALL SCREEN DEVICE

(75) Inventor: Mingchi Stephen Mak, Belmont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 722 days.

(21) Appl. No.: 10/285,789

(22) Filed: Oct. 31, 2002

(65) Prior Publication Data

US 2004/0085369 A1    May 6, 2004

(51) Int. Cl.
G06F 3/14 (2006.01)
(52) U.S. Cl. ...................................... 715/864
(58) Field of Classification Search ................ 715/772, 715/779, 821, 822, 844, 846, 963, 864, 884, 715/664
See application file for complete search history.

(56) References Cited

U.S. PATENT DOCUMENTS 5,428,736 A * 6/1995 Kahl et al. ................. 715/839
5,528,745 A * 6/1996 King et al. ................. 715/753
5,634,100 A * 5/1997 Capps ............................. 705/9
5,855,006 A * 12/1998 Huemoeller et al. ........... 705/9
5,899,979 A * 5/1999 Miller et al. .................... 705/9
6,034,683 A * 3/2000 Mansour et al. ............ 715/764
6,466,236 B1 * 10/2002 Pivowar et al. ............. 715/835

* cited by examiner

Primary Examiner—Kristine Kincaid
Assistant Examiner—Thanh Vu
(74) Attorney, Agent, or Firm—Martine Penilla & Gencarella, LLP

(57) ABSTRACT

An invention is provided for presenting time related data on small screen devices is disclosed. The invention includes examining a plurality of time related data entries to obtain a start time and an end time for each time related data entry, and generating a time bar based on the time related data. The time bar includes a plurality of pixels, wherein a predefined block of pixels represents a particular period of time. The time bar also includes a plurality of indicia, such as hour numbers, indicating a plurality of times. The start time and the end time of each time related data entry are correlated to pixels on the time bar, and an intensity of pixels on the time bar between the start time and the end time of each time related data entry is changed.

15 Claims, 8 Drawing Sheets

SYSTEM AND METHOD FOR PRESENTING TIME RELATED DATA ON A SMALL SCREEN DEVICE

CROSS REFERENCE TO RELATED APPLICATIONS

This application is related to U.S. patent application Ser. No. 09/513,015, filed Oct. 31, 2002, and entitled "System and Method for Displaying Two-Dimensional Data on Small Screen Devices," which is incorporated herein be reference.

BACKGROUND OF THE INVENTION

1. Field of the Invention

This invention relates generally to data display on small screen devices, and more particularly to systems and methods for presenting time related data on small screen devices.

2. Description of the Related Art

Recent advancements in cellular phone technologies have made instant communication easier and faster than ever. Originally analog, cellular systems have evolved to a digital format, which has enabled the cellular phone to become a smart phone having increased data storage capability and access to the Internet. Cellular phone systems generally include numerous base stations, each covering a small geographic area, known as a "cell," that slightly overlaps adjacent cells at the borders. The cells, combined with low power transmitters, provide a communication network for cellular phone users.

The reduced costs and instant communication ability of the cellular phone has resulted in an increased dependents on cellular phones when away from the home, office, and when traveling. Moreover, because of the memory available in most cellular phones, increasingly complex data can be stored in cellular phone memory, such as electronic task list data.

Task list data is an example of a time related data set. Individuals often use time related data, such as task lists and weekly viewers, to schedule their day, week, and/or month. Such data provides the user with a means to plan their day, and also provides reminders for individual appointments. Unfortunately, small screen devices such as cellular phones have a limited amount of screen space to display information, generally in the range of about 108×96 pixels. Even when higher resolutions are utilized, the small size of the screen limits the information that can be displayed. For example, at a resolution of 1024×768 pixels, the screen can only display ten rows of lines if the screen is two inches in height. As a result, conventional small screen devices are limited in the level of detail they provide to the user. In particular, conventional small screen devices do not provide a user with a broad overview of their schedule, which is often needed to help plan a day.

FIG. 1 is a diagram showing an exemplary prior art small screen user interface (UI) for a task list 100. The exemplary prior art task list UI 100 generally includes a signal strength indicator 102 and a battery power indicator 104 in addition to the phonebook data. The signal strength indicator 102 informs the user as to the signal strength currently available at the user's current location, while the battery power indicator 104 informs the user as to the current power available in cellular phone's battery. The task list data generally includes a date title bar 106 and a plurality of task entries 108a-108c. Each task entry includes a task time 110a-110c and a corresponding task description 112a-112c.

As illustrated in FIG. 1, the prior art task list UI 100 only provides the user with a list of discrete data, namely, a list of task entries 108a-108c. The problem with the prior art task UI 100 is that the user is not provided with an informative overview of the day's schedule. That is, the user cannot easily determine what time is free and what time is accounted for using the prior art task list UI 100. For example, the user must subtract start and end times of the discrete task entries 108a-108c to determine which times are free. Further, the prior art task list UI 100 does not provide the user with a visual representation of the task schedule, which can be easily glanced at to get an overview of the day's tasks and appointments.

Moreover, if more tasks occur during a particular day than can be displayed at once on the small screen device, the user cannot determine the schedule for events not currently listed. In order to determine the schedule for times not currently displayed, the user must scroll down the task list to reveal the concealed tasks. For example, in FIG. 1, if more than three tasks are present in the day, not all the tasks will be listed on the screen at once. In addition, the user cannot determine at a glance whether more than three tasks are present during the current day. Also, if additional tasks are present, the user must scroll down to the concealed tasks to determine when they occur and how much time is required for each task.

In view of the foregoing, there is a need for techniques for presenting time related data on small screen devices. The time related data should be presented such that an overview of schedule is provided to the user, to allow the user to better plan their schedule. Further, the time related data should be presented such that a user can easily determine when free time is available between tasks, which can be used to insert future tasks or appointments. Moreover, the presentation of the time related data should allow the user to determine the schedule for entire time represented by the schedule. In particular, the user should be presented with information regarding time requirements for tasks not currently listed on the screen, but present in the current schedule.

SUMMARY OF THE INVENTION

Broadly speaking, embodiments of the present invention fill these needs by providing a time bar UI that allows a user to easily view an overview of the schedule represented by the current task list. In one embodiment, a method for presenting time related data on small screen devices is disclosed. The method includes examining a plurality of time related data entries to obtain a start time and an end time for each time related data entry, and generating a time bar based on the time related data. The time bar includes a plurality of pixels, wherein a predefined block of pixels represents a particular period of time. The time bar also includes a plurality of indicia, such as hour numbers, indicating a plurality of times. The start time and the end time of each time related data entry are correlated to pixels on the time bar, and an intensity of pixels on the time bar between the start time and the end time of each time related data entry is changed.

An additional method for presenting time related data on small screen devices is disclosed in a further embodiment of the present invention. The method includes presenting a plurality of time related data entries and a selection indicator on a screen. The selection indicator is used to indicate a selected time related data entry. In addition, a time bar is displayed on the screen having a plurality of task sections. Each task section defines a start time and end time of a particular time related data entry. Also, a time bar task selection indicator is provided on the time bar. The time bar task selection indicator indicates the task section related to the selected time related data entry. Typically, the time bar can include a plurality of pixels, wherein a predefined block of pixels defines each task section. Also, the block of pixels defining each task section can be a different intensity than pixels of the time bar not defining a task section.

In a further embodiment, a computer program embodied on a computer readable medium is disclosed for presenting time related data on small screen devices. The computer program includes program instructions that examine a plurality of time related data entries to obtain a start time and an end time for each time related data entry. Program instructions are also included that generate a time bar having a plurality of pixels. As above, a block of pixels on the time bar represents a particular period of time, Also, the time bar include a plurality of indicia indicating a plurality of times. The computer program further includes program instructions that correlate the start time and the end time of each time related data entry to pixels on the time bar, and program instructions that change an intensity of pixels on the time bar between the start time and the end time of each time related data entry. Optionally, the computer program can generate a dynamic time bar. For example, the computer program can include program instructions that determine an earliest start time for an earliest occurring time related data entry and a latest end time for a latest occurring time related data entry. In this case, program instructions can also be included that set a time period covered by the time bar equal to a time period between the earliest start time and the latest end time. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a time bar UI that allows a user to easily view an overview of the schedule represented by the current task list. Broadly speaking, the time bar UI includes indicators for time utilized by the tasks for the current schedule, which can be presented on one screen. As a result, the user is presented with an overview of time used during the day, week, or month, depending the time period covered by the time related data UI. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
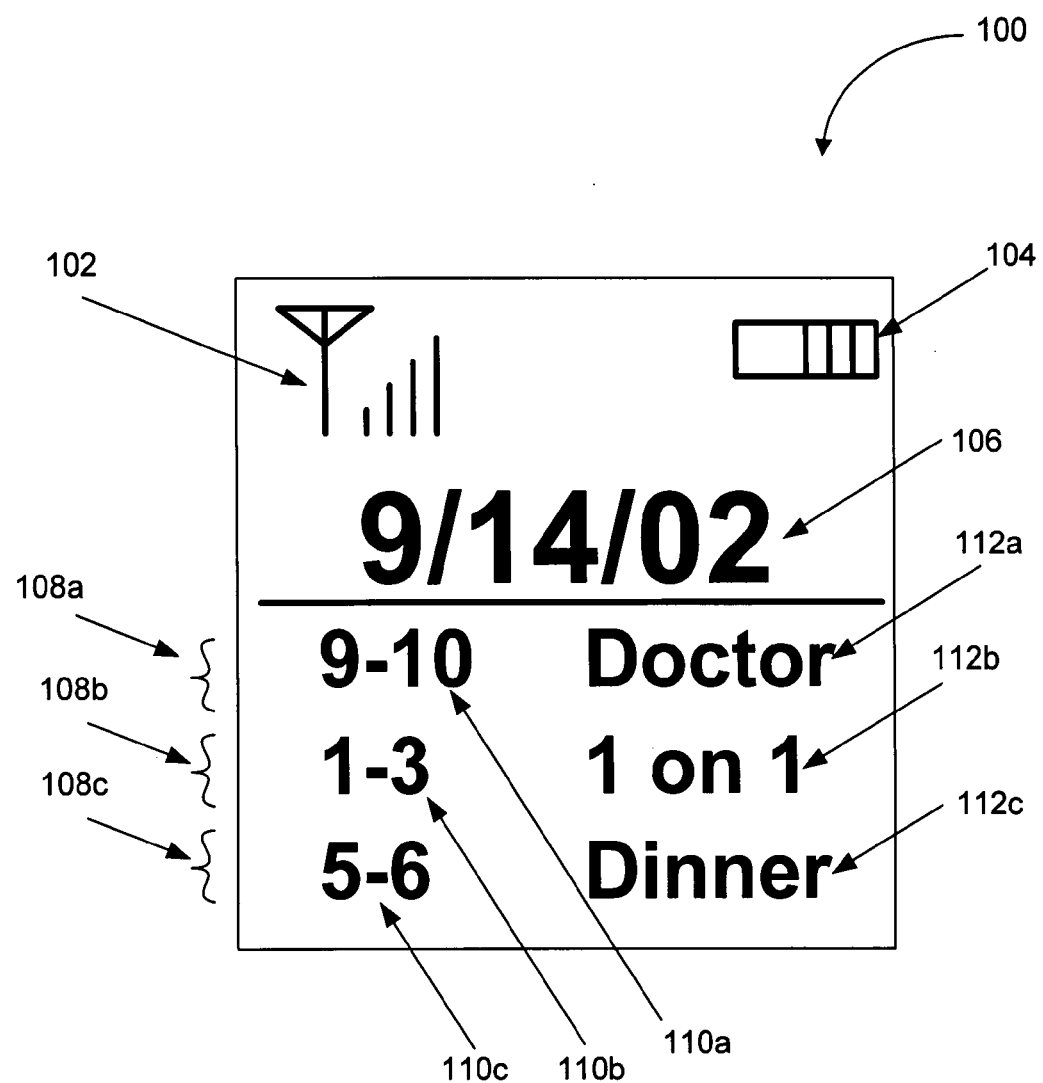
FIG. 1 is a diagram showing an exemplary prior art small screen user interface (UI) for a task list.
Figure 2:
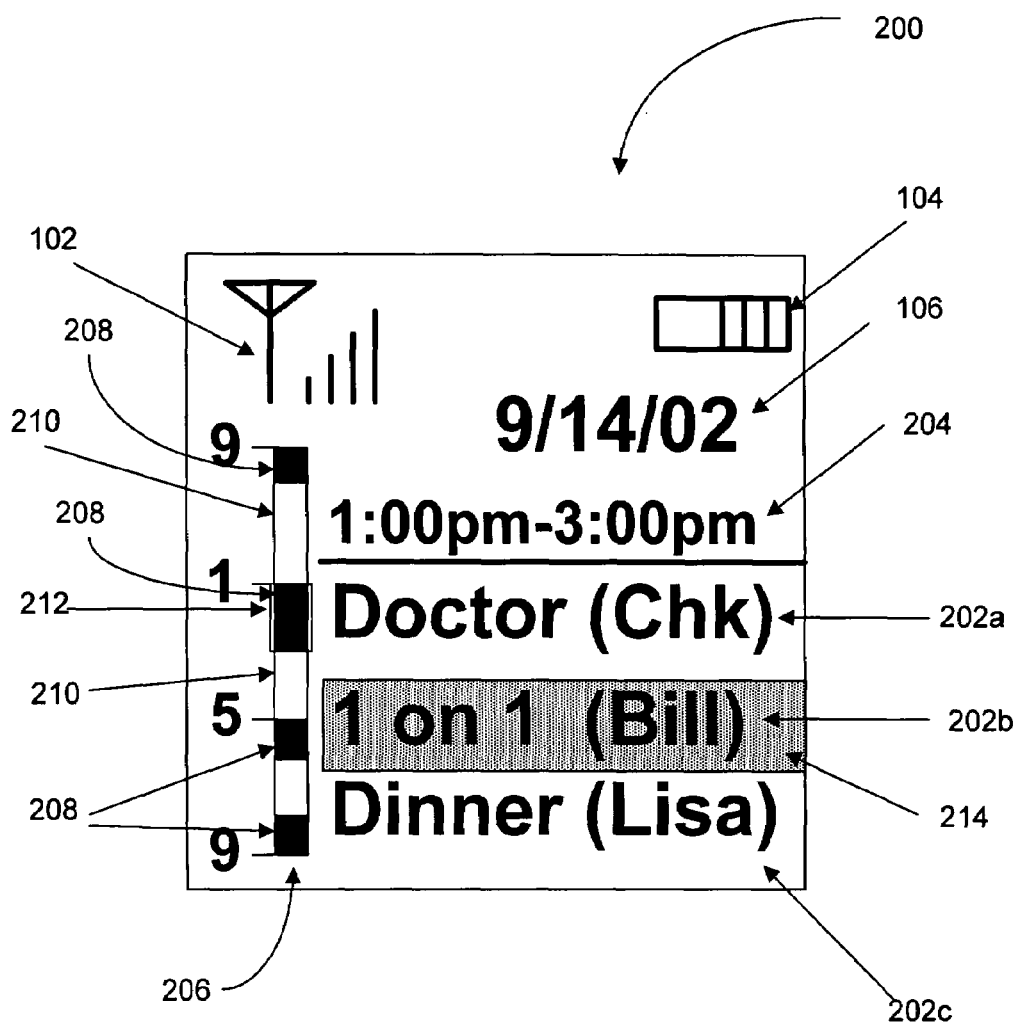
FIG. 2 is diagram showing an exemplary time bar UI for time related data, in accordance with an embodiment of the present invention.

FIG. 1 was described in terms of the prior art. FIG. 2 is a diagram showing an exemplary time bar UI 200 for time related data, in accordance with an embodiment of the present invention. Similar to above, the exemplary time bar UI 200 can include a signal strength indicator 102 and a battery power indicator 104 in addition to the time related data. The signal strength indicator 102 informs the user as to the signal strength currently available at the user's current location, while the battery power indicator 104 informs the user as to the current power available in cellular phone's battery. The time bar UI 200 further includes a data title bar 106, a plurality of time related data entries 202a-202b, and a selection indicator 214, which indicates the currently selected time related data entry. In addition, a task time 204 is displayed for the currently selected time related data entry.

To provide an overview of the schedule represented by the current time related data set, the time bar UI 200 of the embodiments of the present invention uses a time bar 206. The time bar 206 is divided into a plurality of sections based on the time period covered by the time related data. For example, the time bar UI 200 illustrated in FIG. 2 represents time related data for a day schedule. In this example, the time bar 206 covers the hours between 9:00 a.m. to 9:00 p.m. Hour indicators are provided along the side of the time bar 206 to allow easy identification of the hours of the day schedule.

Time used by the time related data entries 202a-202c is indicated on the time bar 206 by task sections 208. A task section 208 is an area of the time bar 206 that is "filled-in" based on the time period covered by each time related data entry 202a-202c. For example, in FIG. 2, the time related data entry "1 on 1 (Bill)" 202b occurs between the hours of 1:00 p.m. and 3:00 p.m. Hence, the pixels of the time bar 206 are "filled-in" between the hours of 1:00 p.m. and 3:00 p.m. That is, the task section 208 for the time related data entry "1 on 1 (Bill)" 202b is the area of the time bar 206 covered by pixels representing the hours between 1:00 p.m. and 3:00 p.m. The time bar 206 further includes a time bar task selection indicator 212, which indicates the task section 208 on the time bar 206 related to the currently selected time related data entry.

The time bar 206 can further include a plurality of free sections 210. A free section 210 is an area of the time bar 206 that is not "filled-in," based on the time period covered by the time related data entries 202a-202c. For example, in FIG. 2, the time related data entry "Doctor (chk)" 202a occurs between the hours of 9:00 a.m.-10:00 a.m. and the time related data entry "1 on 1 (Bill)" 202b occurs between the hours of 1:00 p.m. and 3:00 p.m. Thus, the time period between 10:00 a.m., which is the end of time related data entry 202a, and 1:00 p.m., which is the start time of time related data entry 202b, is free time. This free time is shown as a free section 210 on the time bar 206, thus allowing the user to easily identify the free time available for other purposes. Although the exemplary time bar 206 of FIG. 2 is illustrated as a vertical bar, it should be noted that a time bar of the embodiments of the present invention can be presented in any form. For example, a time bar of the embodiments of the present invention can be presented as a horizontal time bar, or as a time line with bolder line weights used for task sections 208.

In operation, the user can browse through the time related data using navigation controls on the small screen device. For example, many cell phones include a plurality of direction keys and/or a joystick that can be used for navigation. In this case, the up and down directional keys, for example, can be utilized to navigate the time related data entries 202a-202c by moving the selection indicator 214 up and down the list of time related data entries 202a-202c. Similarly, up and down joystick movement, for example, can be utilized to navigate the time related data entries 202a-202c by moving the selection indicator 214 up and down the list of time related data entries 202a-202c. Other control examples can include, indicators on a touch screen that send navigation commands in response to a user's touch, and voice recognition software that sends navigation commands in response to a user's voice commands.

It should be noted, however, that the above control description is for exemplary purposes only. Any small screen device controls can be utilized for navigation purposes. For example, the right and left directional keys can be utilized to navigate the time related data entries 202a-202c by moving the selection indicator 214 up and down the list of time related data entries 202a-202c. Similarly, right and left joystick movement, for example, can be utilized to navigate the time related data entries 202a-202c by moving the selection indicator 214 up and down the list of time related data entries 202a-202c.

When the selection indicator 214 is moved to a particular time related data entry 202a-202c, the task time 204 is displayed for the currently selected time related data entry. The task time 204 is the time period covered by the selected time related data entry. For example, in FIG. 2, the currently selected time related data entry is the "1 on 1 (Bill)" 202b time related data entry, which occurs between the hours of 1:00 p.m. and 3:00 p.m. Hence, "1:00 p.m.-3:00 p.m." is displayed as the task time 204 for the currently selected time related data entry.

In addition, the time bar task selection indicator 212 is moved to the task section 208 related to the currently selected time related data entry. For example, in FIG. 2, the currently selected time related data entry is the "1 on 1 (Bill)" 202b time related data entry, which occurs between the hours of 1:00 p.m. and 3:00 p.m. Hence, the time bar task selection indicator 212 is moved to the task section 208 indicating the 1:00 p.m.-3:00 p.m. time period. In this manner, the user can visually identify when during the day a particular event occurs, thus giving the user an enhanced feel for the day's events.

Figure 3:
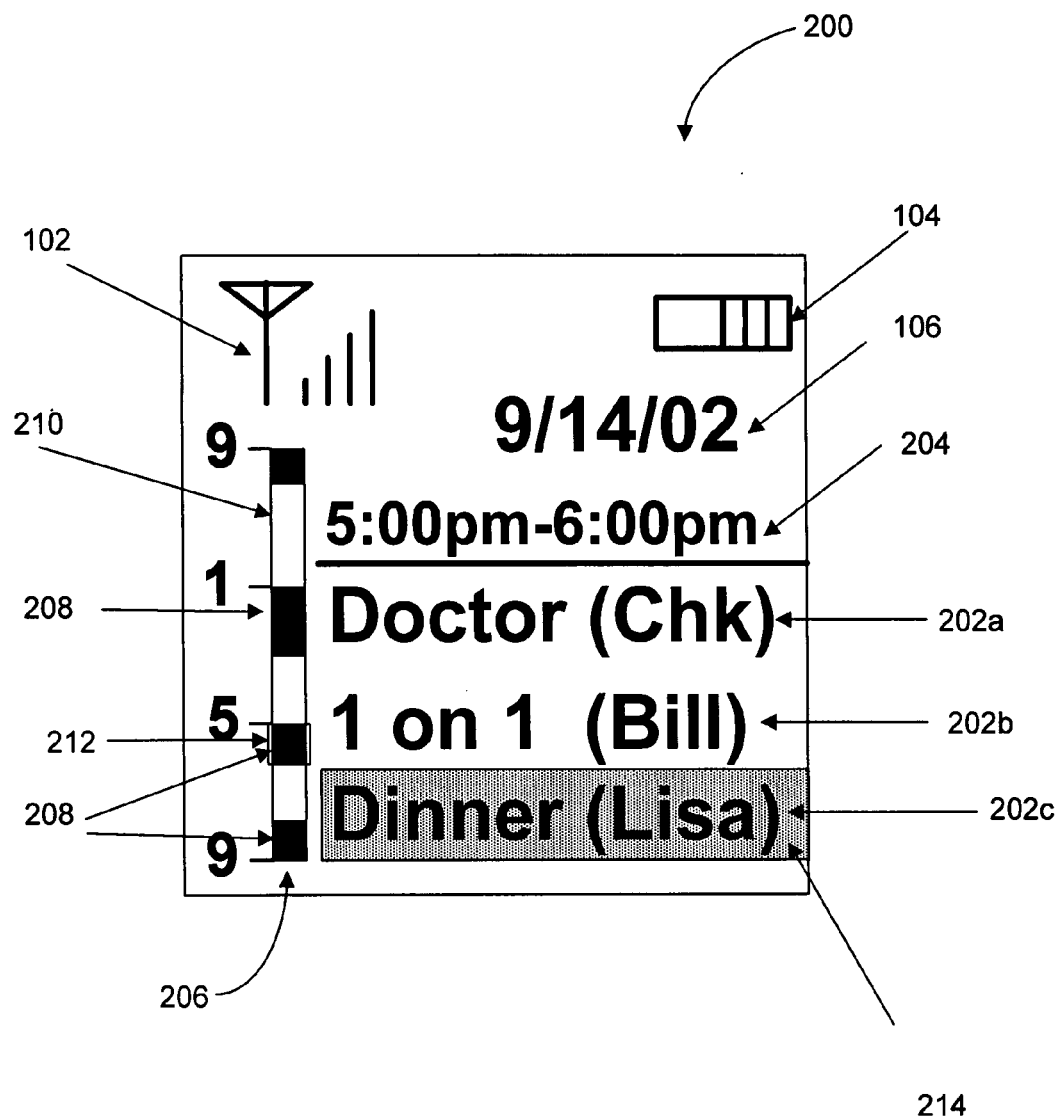
FIG. 3 is a diagram showing the exemplary time bar UI after selection of a different time related data entry, in accordance with an embodiment of the present invention.

FIG. 3 is a diagram showing the exemplary time bar UI 200 after selection of a different time related data entry, in accordance with an embodiment of the present invention. In particular, FIG. 3 illustrates exemplary screen data display changes occurring from FIG. 2 when a user selects a new time related data entry. For example, in FIG. 3 the user has moved the selection indicator to the data entry "Dinner (Lisa)" 202c, which occurs between the hours of 5:00 p.m. and 6:00 p.m. Hence, "5:00 p.m.-6:00 p.m." is displayed as the task time 204 for the currently selected time related data entry. In addition, the time bar task selection indicator 212 is moved to the task section 208 indicating the 5:00 p.m.-6:00 p.m.

As can be appreciated, using the time bar of the embodiments of the present invention, users can identify time periods covered by time related data entries not currently listed on the screen. For example, in FIG. 3, only the first three time related data entries 202a-202c are shown on the screen. However, by examining the time bar 206, the user can determine that another time related data entry occurs between the hours of 8:00 p.m. and 9:00 p.m.

Figure 4:
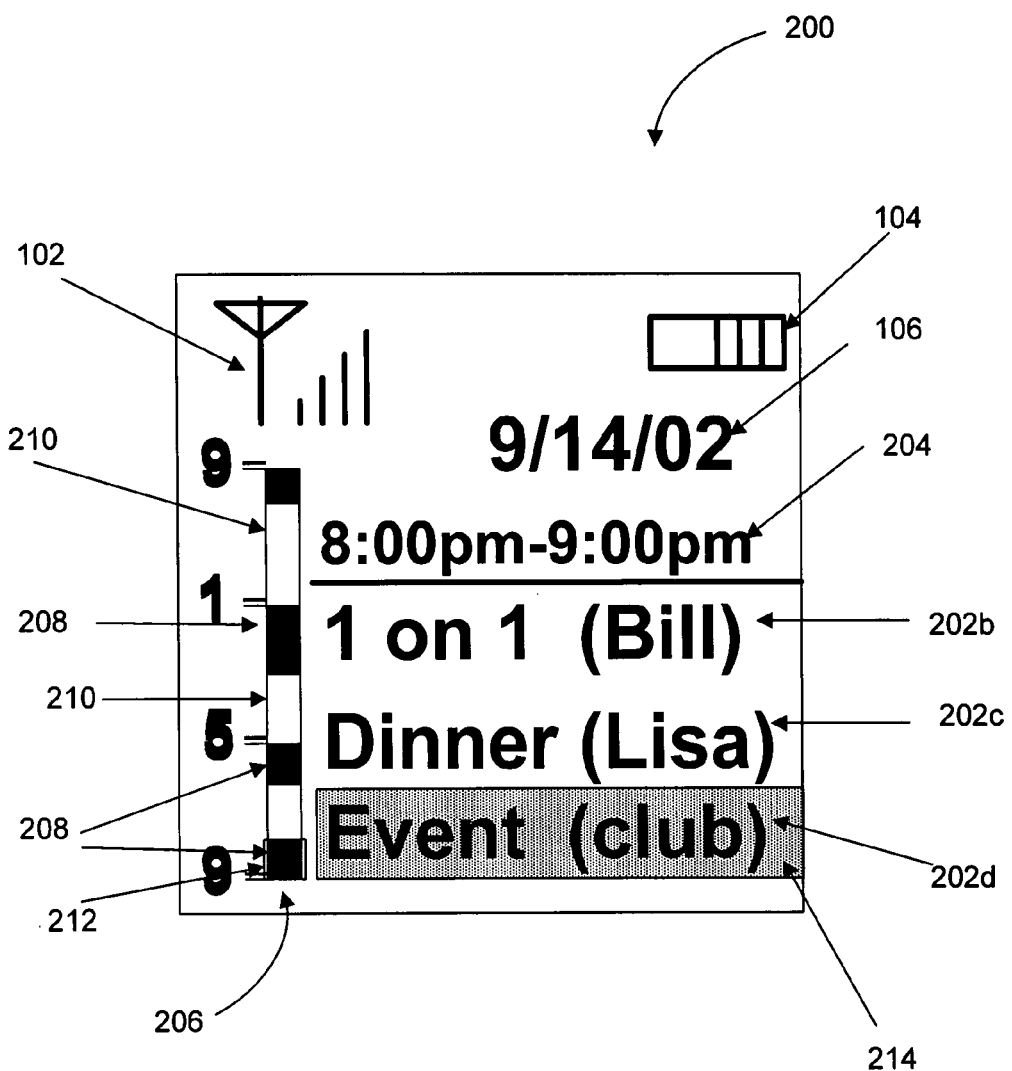
FIG. 4 is a diagram showing the exemplary time bar UI after selection of an off screen time related data entry, in accordance with an embodiment of the present invention.

FIG. 4 is a diagram showing the exemplary time bar UI 200 after selection of an off screen time related data entry, in accordance with an embodiment of the present invention. In particular, FIG. 4 illustrates exemplary screen data display changes occurring from FIG. 3 when a user selects a new time related data entry not shown on FIG. 3. For example, as mentioned above, by examining the time bar 206, the user can determine that another time related data entry occurs between the hours of 8:00 p.m. and 9:00 p.m. In FIG. 4, the user has scrolled down the list of time related data entries using the selection indicator 214 to select the time related data entry "Event (club)" 202d, which was not previously displayed in FIG. 3.

The time related data entry "Event (club)" 202d occurs between the hours of 8:00 p.m. and 9:00 p.m. Hence, "8:00 p.m.-9:00 p.m." is displayed as the task time 204 for the currently selected time related data entry. In addition, the time bar task selection indicator 212 is moved to the task section 208 indicating the 8:00 p.m.-9:00 p.m. Thus, using the task sections 208, the user can identify time periods covered by time related data entries not currently listed on the screen. Hence, embodiments of the present invention advantageously allow the user to view scheduled time for all events during the time period covered by the schedule, without requiring the user to browse through the entire list of time related data entries.

Figure 5:
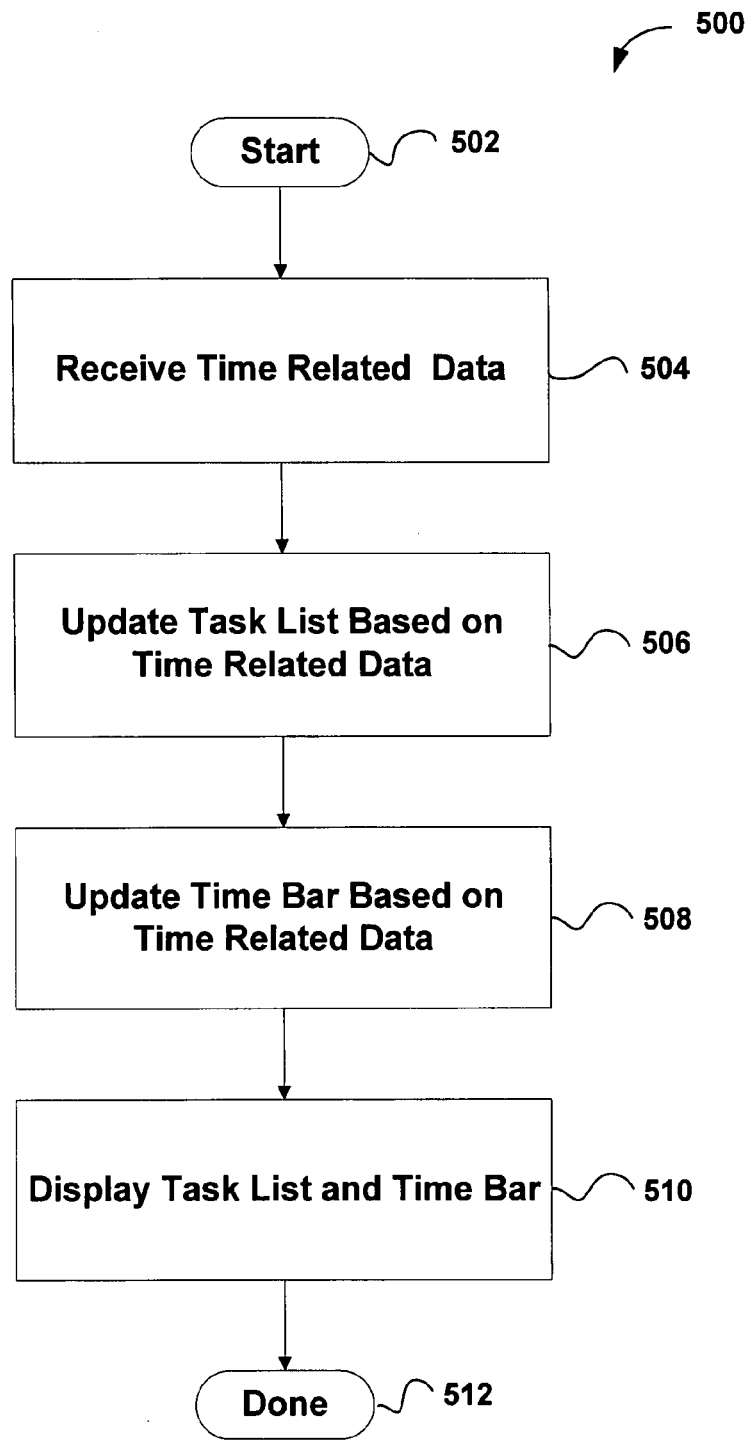
FIG. 5 is a flowchart showing a method for presenting a time bar UI on a small screen device, in accordance with an embodiment of the present invention.

FIG. 5 is a flowchart showing a method 500 for presenting a time bar UI on a small screen device, in accordance with an embodiment of the present invention. In an initial operation 502, preprocess operations are performed. Preprocess operations can include, for example, installing time bar UI software on the small screen device, loading time bar UI software into memory, and other preprocess operations that will be apparent to those skilled in the art after a careful reading of the present disclosure.

In operation 504, time related data is received and stored. Time related data generally is received from a user, typically through manual entry into the small screen device. However, small screen devices can also be connected to larger computing resources to download data from the computing resource. For example, a small screen device can be connected to a desktop computer using a connection device. Time related data stored on the desktop computer can then be downloaded to the small screen device. Typically, the time related data includes a plurality of entries, each including a start time and an end time for the particular event the time related data entry represents. In addition, each time related data entry can also include a brief description of the event, for easy identification by the user. As previously noted, the time period covered by the time related data entries can be of any length. For example, typical time periods include, a day, a week, a month, and a year. In the case of shorter time periods, such as a day, the start and end times generally are hours or minutes of the day. In the case on longer time periods, such as a week or month, the start and end times can be particular days of the week or month.

The task list then is updated based on the time related data, in operation 506. The task list is a list of the time related data entries formatted based on the preferred presentation on the screen of the small screen device. For example, referring to FIG. 2, the task list includes a list of the descriptions for each time related data entry stored on the small screen device. As mentioned above, when a particular time related data entry is selected, the corresponding start and end times for the selected time related data entry are displayed.

Referring back to FIG. 5, the time bar is updated based on the time related data in operation 508. As mentioned above, embodiments of the present invention use a time bar to provide an overview of the schedule represented by the current time related data set. The time bar is divided into a plurality of sections based on the time period covered by the time related data, and hour indicators are provided along the side of the time bar to allow easy identification of the hours of the day schedule. In operation 508, task sections are created to indicate time used by the time related data entries. As described previously, a task section is an area of the time bar that is "filled-in" based on the time period covered by each time related data entry. The time bar can further include a plurality of free sections. A free section is an area of the time bar 206 that is not "filled-in," based on the time period covered by the time related data entries.

In operation 510, the task list and the time bar are displayed on the screen of small screen device. As mentioned previously, a task list is a list of the time related data entries formatted based on the preferred presentation on the screen of the small screen device. For example, the task list can be displayed as a list of the descriptions for each time related data entry stored on the small screen device. Often, the entire list of descriptions for each time related data entry will not fit on the screen at once. In this case, a number of time related data entries that will fit on the screen at the same time are displayed. The user can later scroll to non-displayed entries using the navigation controls of the small screen device. However, all time related data for the currently scheduled time period will appear as task sections on the time bar, thus allowing the user to identify all tasks for the time period currently scheduled.

To facilitate selection of a particular time related data entry, a selection indicator is displayed. When a particular time related data entry is selected, the corresponding start and end times for the selected time related data entry are displayed. In addition, a time bar task selection indicator is displayed on the time bar, which indicates the task section related to the currently selected time related data entry. Post process operations are performed in operation 512. Post process operation can include receiving user navigation commands, updating the selection indicator position, updating the time bar task selection indicator position, and other post process operations that will be apparent to those skilled in the art.

Figure 6:
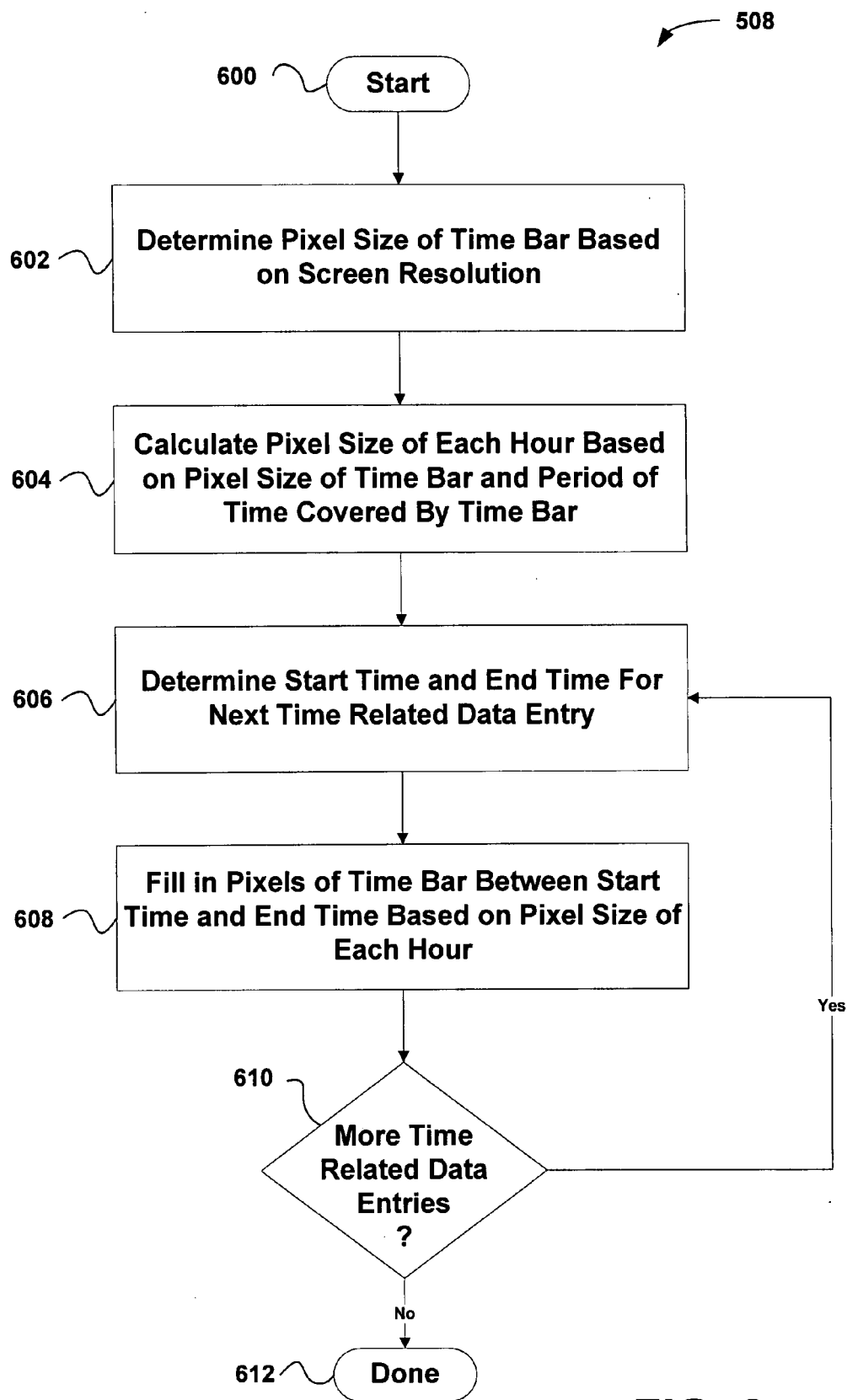
FIG. 6 is a flowchart showing a method for updating the time bar based on time related data, in accordance with an embodiment of the present invention.

FIG. 6 is a flowchart showing a method 508 for updating the time bar based on time related data, in accordance with an embodiment of the present invention. In an initial operation 600, preprocess operations are performed. Preprocess operations can include, for example, receiving time related data, updating the task list based on the time related data, and other preprocess operations that will be apparent to those skilled in the art.

In operation 602, the pixel size on the time bar is determined based on the screen resolution of the small screen device. As mentioned previously, small screen devices such as cellular phones have a limited amount of screen space to display information, generally in the range of about 108×96 pixels. Even when higher resolutions are utilized, the small size of the screen limits the information that can be displayed. Hence, embodiments of the present invention utilize a time bar to provide the user with an overview of the current schedule. To determine the size of the time bar, embodiments of the present invention examine the resolution of the screen on which the time bar will be displayed. Generally, a pixel size is selected such the time bar will be easily viewable and readable to the user.

Figure 7:
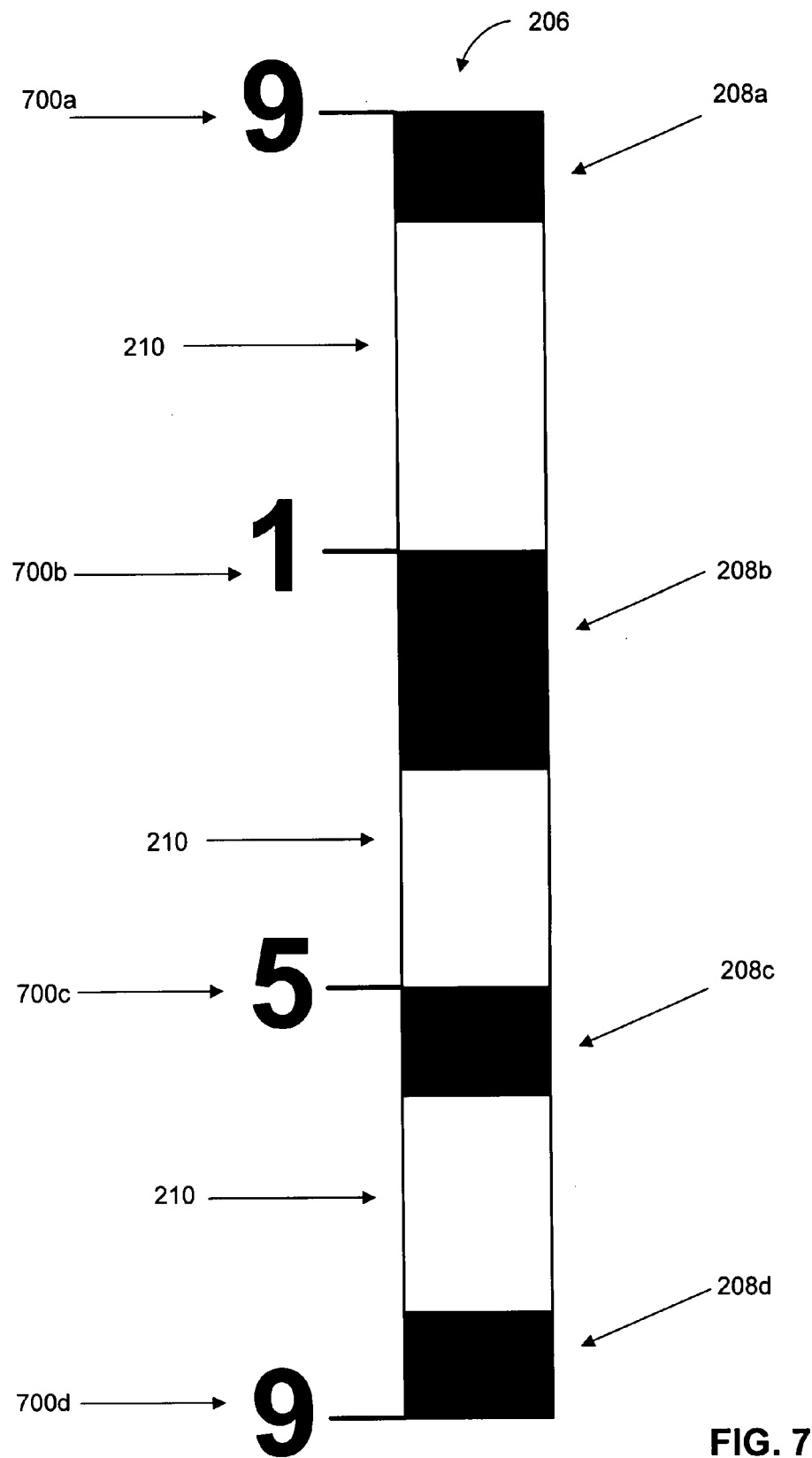
FIG. 7 is a diagram showing an exemplary time bar, in accordance with an embodiment of the present invention.

In operation 604, the pixel size of each hour is determined based on the pixel size of the time bar and the period of time covered by the time bar. The pixel size of each hour is calculated by dividing the number of pixels in the length of the time bar by the number of hours covered by the time bar. For example, FIG. 7 is a diagram showing an exemplary time bar 206, in accordance with an embodiment of the present invention. The exemplary time bar 206 of FIG. 7 covers a time period from 9:00 a.m. to 9:00 p.m. Hence, the exemplary time bar 206 covers a twelve hour time period. To calculate the pixel size of each hour, the number of pixels between the top of the time bar 206 and the bottom of the time bar 206 is divided by twelve. For example, if the time bar 206 is seventy-two pixels in length, then the pixel size of each hour would be six pixels (72/12=6). This pixel size is the length of each hour, the pixel width of each our being the width of the time bar 206. Although, the above example is described in terms of hours, it should be noted that any unit of time can be represented. For example, two or three hour intervals can be represented, or days, weeks, or years can be represented.

In operation 606, the next time related data entry is examined to determine the start time and the end time for the particular time related data entry. As described previously, each time related data entry includes a start time and an end time for the particular event represented by the particular time related data entry. In addition, each time related data entry can include a brief description of the event for easy identification by the user. For example, in FIG. 2 the time related data entry "Doctor (chk)" 202a occurs between the hours of 9:00 a.m.-10:00 a.m. Hence, the start time for the time related data entry "Doctor (chk)" 202a is 9:00 a.m. and the end time is 10:00 a.m.

In operation 608, pixels in the time bar between the start time and the end time are filled in based on the pixel size of each hour. Turning back to FIG. 7, the task sections 208a-208d are filled in during operation 608. Continuing with the above example, the start time for the time related data entry "Doctor (chk)" is 9:00 a.m. and the end time is 10:00 a.m. Thus, the pixels on the time bar 206 representing the time period between 9:00 a.m. and 10:00 a.m. are filled in, as illustrated by task section 208a. During the calculation, the number of hours present in the time period between the start time and end time is determined. In the above example, the number of hours in the time period between 9:00 a.m. and 10:00 a.m. is one. Then, beginning at the pixel location of the start time, a number of pixels equal to the pixel size multiplied by the number of hours in the time period are filled in. The width of the filled in task section 208 being the width of the time bar 206.

Referring back to FIG. 6, a decision is then made as to whether more time related data entries remain to be transferred to the time bar, in operation 610. If more time related data entries remain to be transferred to the time bar, the method 508 continues by determining the start and end times of the next time related data entry in operation 606. Turning to FIG. 7, time related data entries continue to be examined and the time bar 206 updated until all the time related data has been processed. When no more time related data entries remain to be transferred to the time bar, the method 508 ends in operation 612, in which post process operations are performed. Post process operations can include displaying the time bar, displaying the task list, and other post process operations that will be apparent to those skilled in the art after a careful reading of the present disclosure.

Figure 8:
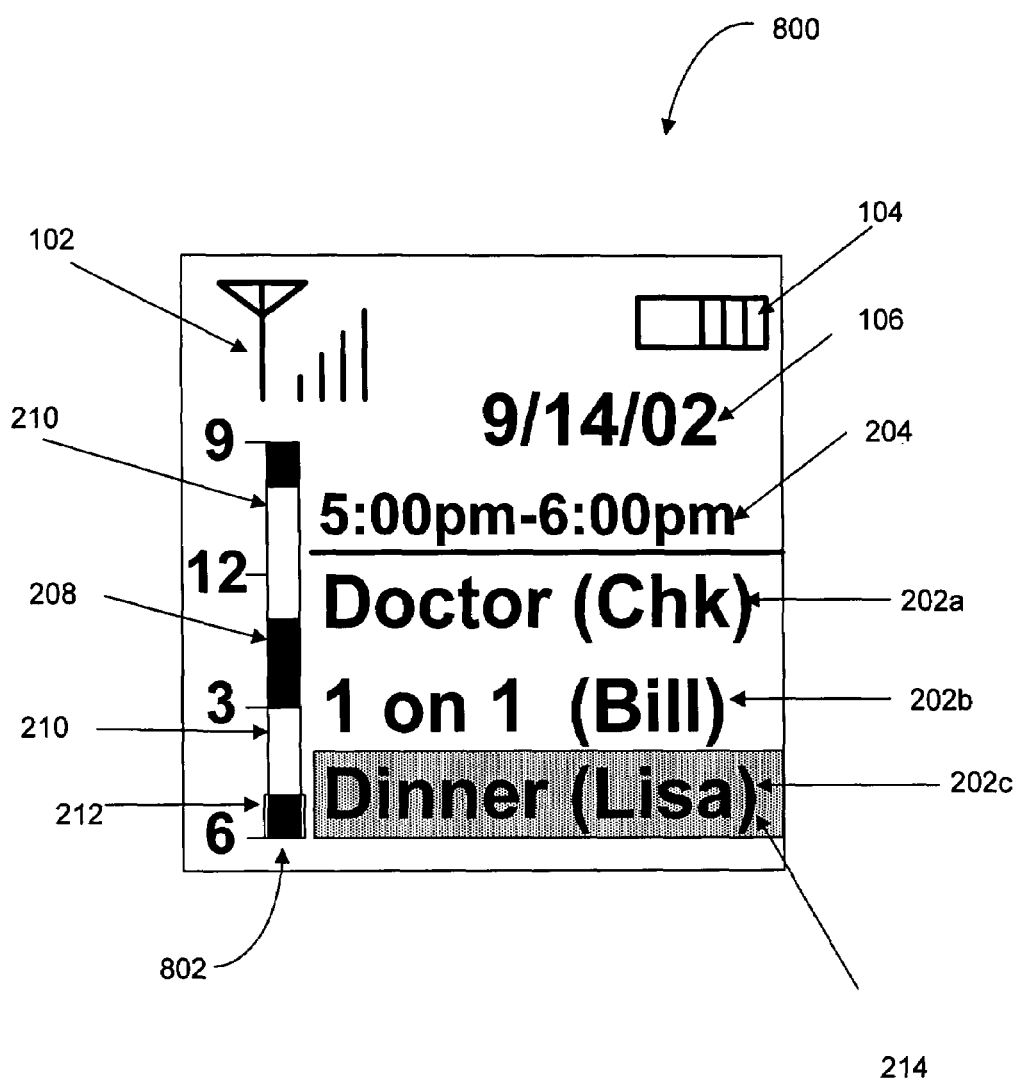
FIG. 8 is a diagram showing an exemplary dynamic time bar UI for time related data, in accordance with an embodiment of the present invention.

In addition to displaying a fixed time range on the time bar, embodiments of the present invention can also display a dynamic time bar, as illustrated in FIG. 8. FIG. 8 is a diagram showing an exemplary dynamic time bar UI 800 for time related data, in accordance with an embodiment of the present invention. Similar to the previous time bar UI described above, the exemplary dynamic time bar UI 800 can include a signal strength indicator 102 and a battery power indicator 104 in addition to the time related data. As above, the dynamic time bar UI 300 includes a data title bar 106, a plurality of time related data entries 202a-202b, and a selection indicator 214, which indicates the currently selected time related data entry. In addition, a task time 204 is displayed for the currently selected time related data entry.

The dynamic time bar UI 800 uses a dynamic time bar 802 to provide an overview of the schedule represented by the current time related data set. Similar to the above described time bar, the dynamic time bar 802 is divided into a plurality of sections based on the time period covered by the time related data. In addition, hour indicators are provided along the side of the dynamic time bar 802 to allow easy identification of the hours of the day schedule. However, the period of time covered by the dynamic time bar 802 is the time period between the start of the earliest time related data entry and the end of the latest time related data entry.

For example, in FIG. 8 the start time of the earliest time related data entry is 9:00 a.m. and the end time of the latest time related data entry is 6:00 p.m. Thus, the time period covered by the time bar is 9:00 a.m. to 6:00 p.m. In this manner, greater time resolution can be achieved on the dynamic time bar 802 when the time related data for the day covers fewer hours than are covered using a fixed time bar. For example, in FIG. 2 the time bar was fixed from 9:00 a.m. to 9:00 p.m., which is twelve hours. The dynamic time bar 802 in FIG. 8 covers time period from 9:00 a.m. to 6:00 p.m., which is nine hours. Thus, the number of pixels used for each hour can be larger, resulting in better resolution and viewing for the user.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for presenting time related data on small screen devices, comprising the operations of:

examining a plurality of time related data entries to obtain a start time and an end time for each time related data entry, each time related data entry further including a description;

generating a time bar including a plurality of pixels, wherein a predefined block of pixels represents a particular period of time, and wherein the time bar includes a plurality of indicia indicating a plurality of times, the period of time covered by the time bar set based on an earliest start time of an earliest occurring time related data entry for a particular period and a latest end time for a latest occurring time related data entry for the particular period so as to provide an overview of a complete task period in a single window frame;

correlating the start time and the end time of each time related data entry to pixels on the time bar;

changing an intensity of pixels on the time bar between the start time and the end time of each time related data entry;

providing a selection indicator, the selection indicator capable of selecting a particular time related data entry; and presenting,
 i) a list of descriptions from each time related data entry,
 ii) the time bar,
 iii) the selection indicator that identifies a selected time related data entry, and
 iv) task time corresponding to a currently selected time related data entry in a single window frame without requiring user action to maintain display of the list of descriptions.

2. A method as recited in claim 1, further comprising the operation of displaying a start time and an end time for a selected time related data entry on the screen.

3. A method as recited in claim 1, further comprising the operation of providing a time bar task selection indicator, the time bar task selection indicator indicating the start time and end time of the selected time related data entry on the time bar.

4. A method as recited in claim 1, wherein the plurality of indicia are numerals indicating particular times.

5. A method as recited in claim 1, wherein each predefined block of pixels represents an hour.

6. A method for presenting time related data on small screen devices, comprising the operations of:

presenting a plurality of time related data entries and a selection indicator on a screen, the selection indicator indicating a selected time related data entry, each of the time related data entries further including a description;

displaying a time bar having a plurality of task sections on the screen along with a list of descriptions from each time related data entry in a single window frame without requiring user action to maintain display of the list of descriptions, each task section defining a start time and an end time of a particular time related data entry, a time period covered by the time bar set based on an earliest start time of an earliest occurring time related data entry for a particular period and a latest end time for a latest occurring time related data entry for the particular period so as to provide an overview of a complete task period in a single window frame; and providing a time bar task selection indicator on the time bar, the time bar task selection indicator indicating the task section related to the selected time related data entry, wherein the display further includes the time bar task selection indicator identifying a currently selected time related data entry and task time corresponding to the currently selected time related data entry.

7. A method as recited in claim 6, wherein the time bar includes a plurality of pixels, wherein a predefined block of pixels defines each task section.

8. A method as recited in claim 7, wherein the block of pixels defining each task section are a different intensity than pixels of the time bar not defining a task section.

9. A method as recited in claim 6, further comprising the operation of displaying a start time and an end time for a selected time related data entry on the screen.

10. A computer program embodied on a computer readable medium for presenting time related data on small screen devices, comprising:

program instructions that examine a plurality of time related data entries to obtain a start time and an end time for each time related data entry, each time related data entry further including a description;

program instructions that generate a time bar including a plurality of pixels, wherein a block of pixels represents a particular period of time, and wherein the time bar includes a plurality of indicia indicating a plurality of times, the period of time covered by the time bar based on an earliest start time of an earliest occurring time related data entry for a particular period and a latest end time for a latest occurring time related data entry for the particular period so as to provide an overview of a complete task period in a single window frame;

program instructions that correlate the start time and the end time of each time related data entry to pixels on the time bar;

program instructions that change an intensity of pixels on the time bar between the start time and the end time of each time related data entry;

program instructions that provide a selection indicator, the selection indicator capable of selecting a particular time related data entry; and presenting,
  i) a list of descriptions from each time related data entry,
  ii) the time bar,
  iii) the selection indicator that identifies a selected time related data entry, and
  iv) task time corresponding to a currently selected time related data entry on a screen in a single window frame without requiring user action to maintain display of the list of descriptions.

11. A computer program as recited in claim 10, further comprising program instructions that determine the earliest start time for the earliest occurring time related data entry and the latest end time for the latest occurring time related data entry.

12. A computer program as recited in claim 11, further comprising program instructions that set the time period covered by the time bar equal to a time period between the earliest start time and the latest end time.

13. A computer program as recited in claim 10 further comprising program instructions that display a start time and an end time for a selected time related data entry on the screen.

14. A computer program as recited in claim 10 further comprising program instructions that provide a time bar task selection indicator, the time bar task selection indicator indicating the start time and end time of the selected time related data entry on the time bar.

15. A computer program as recited in claim 10, wherein each block of pixels represents an hour.

* * * * *